United States Patent
Zhu et al.

(10) Patent No.: US 7,768,973 B2
(45) Date of Patent: Aug. 3, 2010

(54) PROPORTIONAL FAIR SCHEDULER FOR OFDMA WIRELESS SYSTEMS WITH QOS CONSTRAINTS

(75) Inventors: Chenxi Zhu, Gaithersburg, MD (US); Tolga Girici, Hyattsville, MD (US); Jonathan Russell Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 593 days.

(21) Appl. No.: 11/785,892

(22) Filed: Apr. 20, 2007

(65) Prior Publication Data

US 2007/0248048 A1 Oct. 25, 2007

Related U.S. Application Data

(60) Provisional application No. 60/793,628, filed on Apr. 21, 2006.

(51) Int. Cl.
*H04W 4/00* (2009.01)
(52) U.S. Cl. ........................ 370/329; 370/343; 370/344; 455/450
(58) Field of Classification Search ................. 370/310, 370/328, 329; 455/403, 422.1, 450
See application file for complete search history.

(56) References Cited

U.S. PATENT DOCUMENTS

| | | | | |
|---|---|---|---|---|
| 6,065,007 | A | * | 5/2000 | Muthukrishnan et al. ...... 707/7 |
| 7,337,022 | B2 | * | 2/2008 | Wojsznis et al. ............... 700/36 |
| 2003/0198204 | A1 | * | 10/2003 | Taneja et al. ................. 370/332 |
| 2006/0056282 | A1 | * | 3/2006 | Das et al. ..................... 370/208 |

OTHER PUBLICATIONS

Seok Bong Jeong, "Datqa traffic scheduling algorithm for multiuser OFDM system with adaptive modulation considering fairness among users", Computer & Operations research, Jul. 2005.*

* cited by examiner

*Primary Examiner*—William Trost, IV
*Assistant Examiner*—Siming Liu
(74) *Attorney, Agent, or Firm*—Staas & Halsey LLP

(57) ABSTRACT

Available bandwidth and power for users demanding real time and non-real time data traffic are scheduled, while maximizing proportional fairness for the users over a plurality of time slots, and meeting quality of service constraints for real time data traffic users. The Lagrangian multipliers are used to define a function which includes the proportional fair capacity over the plurality of time slots, and the total power, the total bandwidth, and rate of the real time users' constraints. A maximum of the function is determined for each time slot by binary searching two parameters while observing the total power and total bandwidth. An optimal allocation of the bandwidth and power for the time slot is calculated using the two parameters.

15 Claims, 4 Drawing Sheets

PROPORTIONAL FAIR SCHEDULER FOR OFDMA WIRELESS SYSTEMS WITH QOS CONSTRAINTS

CROSS-REFERENCE TO RELATED APPLICATION

This application claims the benefit of priority to U.S. Provisional Application No. 60/793,628 entitled "Proportional Fair Scheduler for OFDMA Wireless Systems with QoS Constraints", by Chenxi, Zhu et al. filed on Apr. 21, 2006 in the USPTO and incorporated by reference herein.

BACKGROUND

1. Field

The embodiments relate to an orthogonal frequency division multiple access (OFDMA) technology applied, for example, to wireless communication systems.

2. Description of the Related Art

Increasing number of users demanding wireless Internet access and a growing number of wireless applications require high speed transmission and efficient utilization of system resources such as power and bandwidth. Orthogonal frequency division multiplexing (OFDM) is a multicarrier transmission technique that is proposed for high speed wireless transmission. It is based on a large number of orthogonal subchannels, each working at a different frequency. OFDM is originally proposed to combat inter symbol interference and frequency selective fading. However it also has a potential for a multiple access scheme, where the subchannels are shared among the competing users. OFDM-based multiple access can also be performed with power control, which adds a degree of flexibility.

In multiple access resource allocation, three main aspects are considered. The first one is spectral efficiency, which means achieving a maximum total throughput with available bandwidth and power. In Time Division Multiple Access (TDMA) transmission, spectral efficiency can be achieved by always allowing the user with the best channel to transmit. In OFDM, each subcarrier experiences a different fading depending on the user, which makes the spectral efficiency to be a more complex problem. The second issue is fairness. If the channel conditions are independent and identically distributed, all users eventually will get the same service, hence fairness is maintained. This is called multiuser diversity. On the other hand, if the distance attenuations of users are different, then some users can get more service than others. Therefore, scheduling algorithms try to provide fairness among nodes. The third important issue is satisfying quality of service (QoS) requirements. An example of QoS requirements can be bounds on delay and/or packet drop limitations for real time applications.

A proportional fair scheduler has been proposed for single carrier systems. The proposed proportional fair scheduler system may work in the context of a High Data Rate (HDR) system. The system is designed for data transfer applications (e.g. FTP and Internet). Users are scheduled to transmit at each time slot and any positive change of one user's rate results in a negative overall change of rates of the other users in the system. The proposed proportional fair scheduler for a single carrier allocates the bandwidth and power to maximize the sum of the logarithms of average user rates:

$$P = \arg\max_S \sum_{i=1}^{N} \ln R_i^{(S)} \quad (1)$$

where $\{1, 2, \ldots, N\}$ is the user set and $R_i^{(S)}$ is the average rate of user i by scheduling policy S. The proportional fairness is achieved by scheduling at each time slot t, a user j according to:

$$j = \arg\max_i \frac{r_i(t)}{R_i(t)}. \quad (2)$$

Here $r_i(t)$ is an instantaneous transmittable rate to user i at the current slot, and $R_i(t)$ is an average data rate that user i has received over time. At each time slot, the average data rate is updated according to the following rule:

$$R_i(t+1) = \alpha R_i(t) + (1-\alpha) r_i(t) \quad (3)$$

In a proportional fair scheme $T=1/(1-\alpha)$ is the length of the sliding time window, and the average rate is computed over this time slot for each time slot. For example, in one proposed single carrier system, $\alpha$ was taken as 0.999. This method maintains fairness in the long run, while trying to schedule the user with the best channel at each slot.

Recently, the proportional fair scheduling has been proposed for multicarrier systems. However, other existing multicarrier systems proposals for proportional fair scheduling do not take into consideration power control and cannot determine the optimum bandwidth allocation when the transmission power can be dynamically assigned. Other proposals discuss the proportional fair scheduling for a single time instant, rather than the long term received rates. Besides, none of the proposals address the real time traffic (e.g., the voice and video data transfer) which has other QoS requirements than the non-real time data transfer.

A major drawback of existing proportional fair scheduling is that it assumes there are infinite packets to be transmitted at time zero and no packet arrivals. This is more suitable for an FTP session where large files can be assumed to be ready to transmit, however not suitable for real time applications such as Voice over Internet Protocol (VoIP) and video streaming. Since different real time applications can have different arrival rates, average service rates corresponding to the real time applications in the long run should be larger than the arrival rate for each session in order to maintain stability. It has been demonstrated that traditional proportional fair scheduling does not ensure stability of queues in some situations.

Another drawback of the existing proportional fair scheduling is that it does not support heterogeneous QoS requirements. For example, in VoIP and Video Streaming applications, there is a delay requirement for each packet. If a packet can not be transmitted in a certain time interval, then that packet has to be dropped, which degrades the quality of real time sessions. In proportional fair scheduling, the time window is very large, and, therefore, there is a long term rate requirement. In real time sessions, a short term rate requirement may occur.

Some existing proposals consider OFDMA based resource allocation without the proportional fairness objective. For example, a proposed subcarrier and bit allocation method aims to satisfy rate requirements of users with a minimum total power. The maximizing total throughput subject to power and subcarrier constraints is addressed, but not for the real time traffic. One existing proposal describes that a proportional rate constraint requires the rates of individual users has to be in certain proportions in order to maintain fairness. However, this approach also doesn't guarantee any short or long term transmission rates. There are also proposals directed to other schemes, such as, Code Division Multiple Access (CDMA). One existing CDMA proposal is directed to a fair queueing scheme with time varying weight assignment, wherein weights are proportional to the channel conditions divided by previously received rates. That is, a base station chooses one mobile station (user) with the highest ratio between the highest usable transmission rate and actual transmission rate, and uses all the power and the bandwidth necessary to transmit to that mobile station in the next time slot. This CDMA proposal focuses on one user but not to scheduling multiple users in the same time slot, and no QoS constraints are satisfied. Another method maximizes throughput (rates) subject to total power and bandwidth constraints in a single time slot.

The optimization problem for a single time slot, models the proportional fairness as follows. Maximize:

$$C(w, P) = \sum_{i=1}^{M} \ln(r_i(w_i, p_i)) \quad (4)$$

subject to $$P \geq \sum_{i=1}^{M} p_i, \ W \geq \sum_{i=1}^{M} w_i, \text{ and } p_i \geq 0, w_i \geq 0, \forall i$$

where ri(wi,pi) is the rate function. The existing scheduling methods may optimize the proportional fairness for a single time slot, but not in a long term (over multiple time slots), and cannot meet the requirements of a real time traffic such as VoIP.

IEEE 802.16 standards define the air interface and medium access control (MAC) specifications for wireless metropolitan area networks. Such networks intend to provide high speed on demand voice, data, and video streaming services for end users. IEEE 802.16 standard is often referred to as WiMax and it provides substantially higher rates than typical cellular networks. Besides WiMax eliminates the costly infrastructure to deploy cables, therefore becoming an alternative to cabled networks, such as fiber optic and DSL systems. The OFDM and OFDMA version of 802.16 systems working under 6 GHz are examples of systems that are suitable for non line of sight (NLOS) communications. WiMax networks are designed for point to multipoint communications, where a base station (BS) transmits to and receives from multiple subscriber stations (SS) and/or mobile stations (MSs) in the base station's coverage area. A SS is fixed and can be either an end user itself, or be the backbone connection of a WLAN.

SUMMARY

According to the embodiments, an apparatus for a multicarrier wireless communication such as distributed OFDMA, schedules channel allocation, i.e. selects the subchannels (corresponding to discrete wavelength intervals) and power levels for each user in a time slot, while optimizing the system capacity under the proportional fairness criterion and maintaining the required QoS level. The framework may be in line with the Mobile WiMax standard (IEEE 802.16e). The embodiments can be applied to WiBro or any other OFDMA based wireless scheduling. The embodiments schedule the transmission power and/or the bandwidth to maximize the proportional fairness for long term rates of data users and ensure quality of service (QoS) for real time sessions in an OFDMA-based wireless system.

According to an aspect of the embodiments, proportional fair scheduling maintains stability and/or meets delay requirements, for example, by putting constraints on transmission rates. The embodiments support a heterogeneous traffic including non-real-time data transfer and/or real time data, such as (without limitation) voice and video traffic. The QoS requirements are specified in terms of minimal rates and the relevant time interval (which reflect the delay requirements).

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
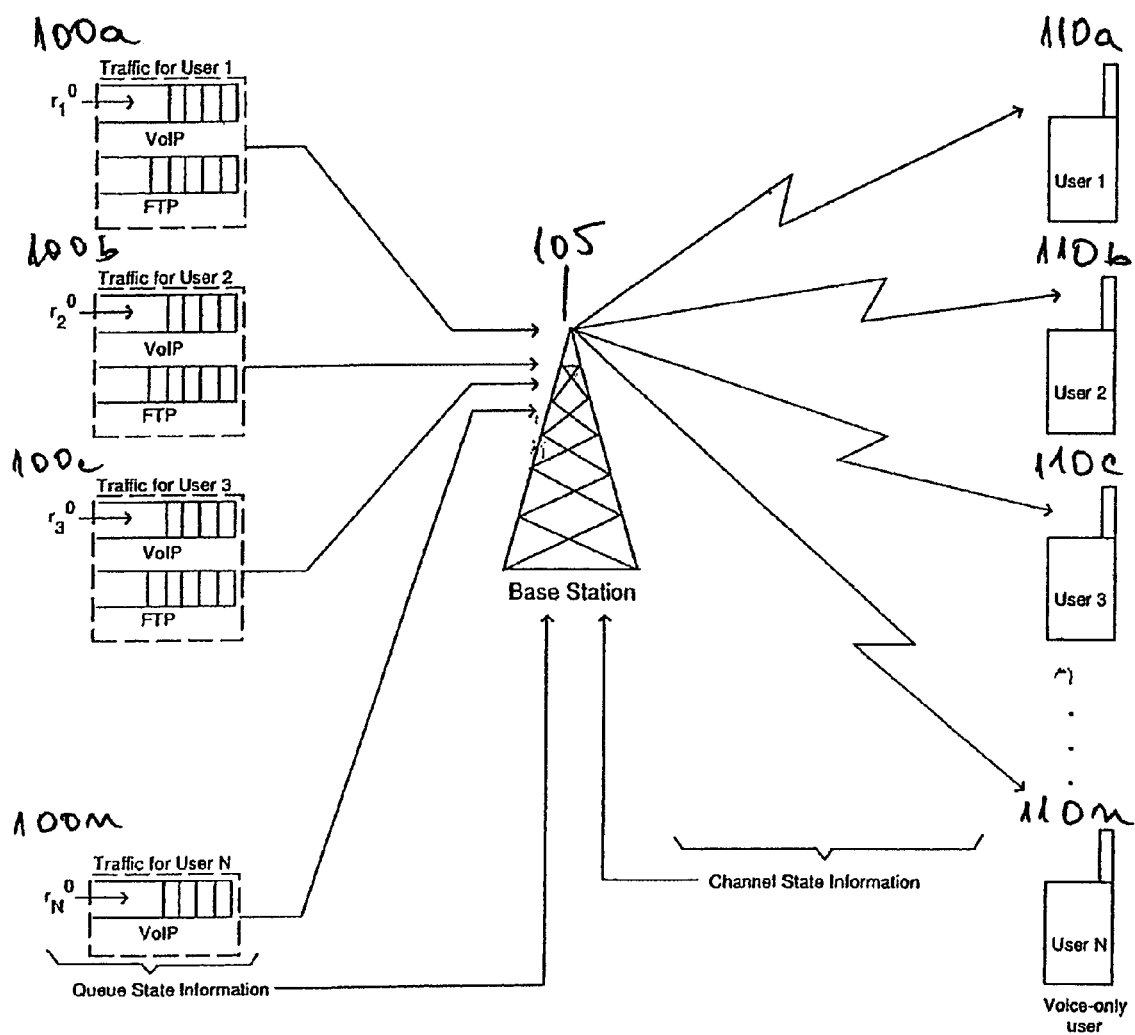
FIG. 1 is a diagram of a wireless communication system, according to an embodiment.

FIG. 1 is a diagram of a wireless communication system, in which the embodiments may be used. A base station 105 (illustrated as an outdoor antenna), can receive simultaneously data 100a, 100b, 100c, . . . , 100n addressed to a plurality of users 110a, 110b, 110c, . . . , 110n. The base station 105 receives queue state information of incoming signals, and channel state information of users, and allocates resources for each of the incoming and outgoing signals. Within the OFDMA framework, the resources allocated to the users come in three dimensions: time slots, frequency (bandwidth) and power. This requires the scheduler to operate with higher degree of freedom and more flexibility, and potentially higher multiplexing capacity. The scheduling embodiments take full advantage of the degree of freedom possible in the OFDMA systems. The scheduling rules must apply differently depending on the QoS requirements and the heterogeneous traffic. The multicarrier proportional fair scheduling methods aim to satisfy heterogeneous stability and delay requirements. More particularly, in contrast to the existing scheduling methods that may optimize the proportional fairness only for a single time slot, the embodiments ensure proportional fairness in a long term (over multiple time slots), and also meet the QoS requirements of a real time traffic such as VoIP.

The WirelessMAN-OFDMA at the physical layer is a multicarrier scheme where multiple access is provided by assigning a subset of carriers to each receiver (e.g. a subscriber station or a mobile station) at each time slot. Therefore, more than one user can receive service in each time slot. The number of carriers is variable (2048, 1024, 512 and 128) depending on the bandwidth size. The total bandwidth B is divided into K subchannels, each including a group of carriers. There are two classes of subchannelization methods. The first class is Adaptive Modulation and Coding (AMC). In this method a number of carriers adjacent on the frequency spectrum are grouped into a Band AMC subchannel. In a multipath fading channel, different subchannels experience different levels of fading. Achievable rates can be maximized by adjusting the modulation and coding rate according to the fading level for each subchannel. The second class includes Partial Use of Subchannels (PUSC) and Full Use of Subchannels (FUSC), which are diversity permutation schemes that distribute the sub-carriers of a subchannel pseudo-randomly in a wide frequency band. These methods provide frequency diversity and inter-cell interference averaging, which minimizes the performance degradation due to fast fading characteristics of mobile environments. PUSC is the default mode of subchannelization and is more suitable for mobile users than AMC. The scheduler and methods described herein use the second class of subchannelization methods, i.e. PUSC/FUSC.

Consider a wireless downlink system, where a base station 105 transmits to respective users 110a-n as in FIG. 1. FIG. 1 illustrates a downlink, but embodiments are also applied to uplink. Downlink refers to the transmission from a base station to the users. Uplink refers to the transmission from the users to the base station. In both the uplink and the downlink direction, the total bandwidth may be limited and has to be distributed (shared) by the plurality of users. In the downlink direction the total transmission power of the base station may be limited and has to be distributed to the users, so the summation of the power assigned to these users is no greater than a threshold (total transmission power of the base station). In the uplink direction, each user station may be subject to its own maximal transmission power limit. The limit on the total transmission power from multiple user stations connected to a base station may also apply, if the interference caused to adjacent base stations need to be controlled.

The noise and interference power density for user i is $N_i^o$, and the channel gain averaged over the entire band from the BS to user i is $h_i$, where $h_i$ includes path loss, shadowing (lognormal fading) and fast fading. Users from two generic classes of users are scheduled. Users in the class $U_D$ are data users and they do not have real time traffic or delay requirements. Users in class $U_R$ are users with real time data traffic (like VoIP and/or streaming video), and they have requirements on delivered rates and packet latency. According to an aspect of an embodiment, the system is time slotted with time slot length $T_S$. The scheduler makes a resource allocation (bandwidth and/or transmission power) decision at each time slot. An active period in a voice conversation and file size can be both very long with respect to the time slot size. Therefore, for optimizing the resource allocation, the number of active voice and data sessions is limited. If the system estimates that not enough resources are available to accommodate all the users, additional resources may be imported or users may be dropped.

Figure 2:
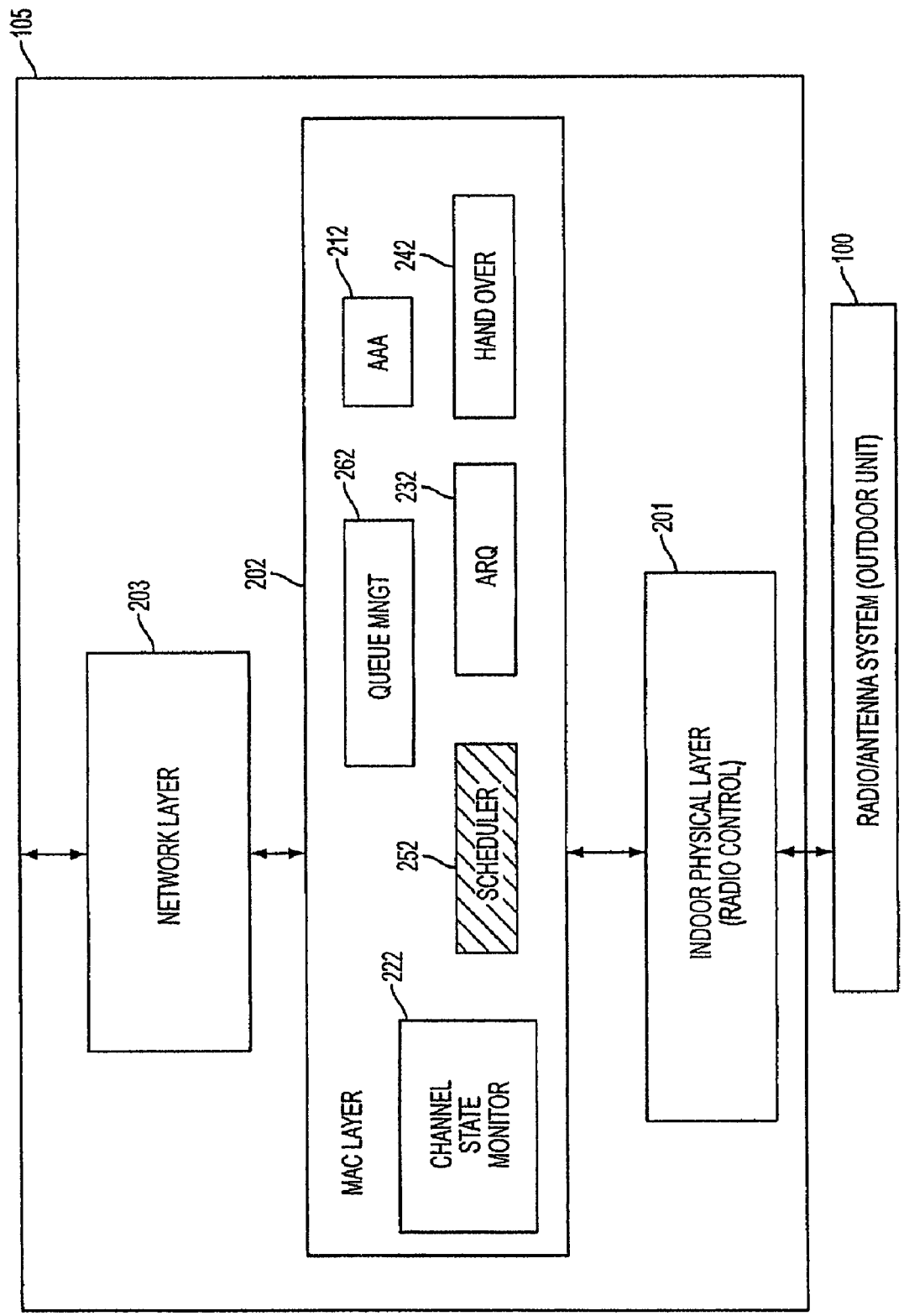
FIG. 2 is a functional block diagram of a base station unit in a wireless communication system, which in the MAC layer includes a scheduler, according an embodiment.

FIG. 2 is a functional block diagram of a base station unit 105 in a wireless communication system according to IEEE 802.16 family of standards, in which MAC layer 202 includes a scheduler 252 according to an embodiment. Three main functional layers of the base station unit 105 can be a physical layer 201, which may receive incoming signals from an outdoor antenna, a media access control (MAC) 202 and a network layer 203. These functional layers are implemented in the base-station 105. The physical layer may be connected to an outdoor unit, such as a radio/antenna system 100.

As illustrated in FIG. 2, the MAC layer 202 may include modules performing functions such as queue management 262, authentication, authorization and accounting (AAA) 212, channel state monitoring 222, Automatic Repeat reQuest (ARQ) 232, and hand-over 242, according to IEEE 802.16. The MAC layer 202 also includes a scheduler 252 scheduling the subchannels (i.e. the bandwidth and/or the power allocation) according to various embodiments. According to an aspect of the embodiments, the scheduler 252 is implemented in a wireless communication system according to IEEE 802.16e. However the claimed embodiments are not limited to IEEE. 802.16e systems and can be applied to any wireless communication system employing OFDMA.

The scheduler 252 may perform jointly Adaptive Power Allocation (APA) and Dynamic Subchannel Assignment (DSA). IEEE 802.16 standards allow several combinations of modulation and coding rates that can be used depending on the signal to noise ratio. Base station 105 allocates the available power and rate among users, where $p_i(t)$ and $w_i(t)$ are the power and bandwidth allocated to user i in time slot t. According to an embodiment, for example, every power and rate pair, the highest allowed modulation and coding scheme is used. As a result, optimal transmission rate becomes an increasing and concave function of the signal to noise ratio. The scheduler 252 assumes initially that the bandwidth and power are continuous, and then discrete and finite modulation schemes are considered.

The formalism employed by the scheduler 252 is explained below. Based on this formalism, the scheduler 252 allocates bandwidth and/or power in each time slot.

The channel capacity to a user i at slot t can be expressed as a function of bandwidth $w_i(t)$ and transmission power $p_i(t)$ assigned to user i;

$$r_i(w_i(t), p_i(t)) = w_i(t)\log_2\left(1 + \beta\frac{p_i(t)h_i(t)}{N_i^0 w_i(t)}\right). \quad (5)$$

$N_i^o$ is the noise and interference power density at the receiver i. The reason for using this model (i.e., the above expression of the capacity) is its simplicity, and also because the typical set of coding and modulation schemes follow the same trend with an offset in signal to noise ratio (SINR). The parameter $0<\beta<1$ compensates the rate gap between Shannon capacity and rate achieved by practical modulation and coding techniques and can be determined from comparing the required receiver sensitivity for different coding and modulation schemes and the Shannon channel capacity.

The scheduler 252 optimizes the resources (i.e., bandwidth and power in each time slot) allocation with long term proportional fairness (i.e. fairness that considers rate history of users, rate in prior time slots) for N users. The system, as a Markov decision type of system, has a state $R(t-1)=[R_1(t-1), R_2(t-1), \ldots, R_N(t-1)]$, where $R(t-1) \in R^{+N}$. The control variables $u(t)=(p(t), w(t))$ are vectors of power and bandwidth allocation at slot t denoted as p(t)=[$p_1(t), p_2(t), \ldots, p_N(t)$], w(t)=[$w_1(t), w_2(t), \ldots, w_N(t)$]. The control space is denoted by U where $$U = \{p, w : \sum_{i=1}^{N} p_i(t) \le P, \sum_{i=1}^{N} w_i(t) \le W,$$

$w_i(t) \le W$, $p_i(t) \ge 0$, $w_i(t) \ge 0$, $\forall i$), where P and W are the total available power and bandwidth. The state (past user rates) is updated at each time slot according to an exponential averaging formula:

$$R_i(t) = \alpha R_i(t-1) + (1-\alpha) w_i(t) \log_2\left(1 - \frac{p_i(t) h_i(t)}{N_i^0 w_i(t)}\right), \forall i, t \quad (6)$$

where the initial state R(0) is a constant (possibly 0). This way, both the current rate corresponding to the most recent time slot, and rates given to the user in the past are considered. The highest consideration is given to the current rate r(t), observed at time t. The rates received at the past t−1, t−2, ... carry diminishing importance.

According to an aspect of the embodiment, in the proportional fair capacity as previously defined (Equation 4), the instantaneous rate $r_i(t)$ is replaced with for example, averaged rate $R_i(t)$. However, the prior art methods did not consider the user rates in a historical perspective (over a plurality of time slots). Therefore, the embodiments ensure long term fairness and not fairness as determined by a sole time slot as in the prior art methods.

$$C(R(t)) = \sum_{i=1}^{N} \ln R_i(t) \quad (7)$$

$$= \sum_{i=1}^{N} \ln\left(\alpha R_i(t-1) + (1-\alpha) w_i(t) \log_2\left(1 + \frac{\beta p_i(t) h_i(t)}{N_i^0 w_i(t)}\right)\right)$$

$$= \sum_{i=1}^{N} \ln R_i(t-1) \left(\alpha + \frac{(1-\alpha) w_i(t) \log_2\left(1 + \frac{\beta p_i(t) h_i(t)}{N_i^0 w_i(t)}\right)}{R_i(t-1)}\right)$$

$$= C(R(t-1)) + \sum_{i=1}^{N} \ln\left(\alpha + \frac{(1-\alpha) w_i \log_2\left(1 + \frac{\beta p_i(t) h_i(t)}{N_0 w_i}\right)}{R_i(t-1)}\right)$$

Greedy schemes are used, in the sense that at slot t, the proportional fair capacity C(R(t)) is maximized without considering the future time slots t+1, t+2, etc., but the prior time slots t−1, t−2, etc. are considered. Only the sum term in Equation 7 is maximized:

$$\max_{p(t),w(t)} \sum_{i=1}^{N} \ln\left(\alpha + \frac{(1-\alpha) w_i \log_2\left(1 + \frac{\beta p_i(t) h_i(t)}{N_0 w_i}\right)}{R_i(t-1)}\right), \text{ i.e.,} \quad (8)$$

$$\max_{p(t),w(t)} \prod_{i=1}^{N} \left(\alpha + \frac{(1-\alpha) w_i(t) \log_2\left(1 + \frac{\beta p_i(t) h_i(t)}{N_i^0 w_i(t)}\right)}{R_i(t-1)}\right).$$

The maximum of the fair capacity is achieved only when all the available power and bandwidth are used.

According to the above formula (8), the throughput for data user is maximized, while the long term fairness among different users is maintained. As an example, this scheduling approach is applicable to FTP users having large amount of non-real time data to be transferred.

However, for a user with real time data traffic like VoIP and Video, different from non-real time data users, only maximizing the long term service rates with the proportional fair constraint may not be enough, and according to an aspect of an embodiment QoS requirements are also satisfied. The QoS requirements (e.g., without limitation, transmission rate and/or packet latency) for a real time user can be specified using a required minimum transmission rate $r_i^o(t)$ which may be updated time slot by time slot. For instance, if a VoIP user has not received any packet for a few time slots, the packet at the head of its transmission queue has experienced some delay close to latency requirements of the VoIP user, and, therefore, the packet should be transmitted at the next time slot. This transmission requirement can be reflected by updating the required transmission rate at the next time slot. This transmission rate requirement $r_i^o$ is added as a constraint to the optimization problem when both, non-real time data service and real time data service are required by the users. A user may demand either non-real time data traffic or real time data traffic. If a user requires both non-real time data and real time data traffic, the user can be considered as two users, where one user demanding non-real time data traffic and the other user demanding real time data traffic.

Assume $U_D$ is the set of users that demand non-real time data service, and $U_R$ is the set of users that demand real time service (like VoIP or video). Let $n_i = N_0^i / h_i$ be the normalized noise and interference level. When both types (i.e., non-real time data and real time) of traffic need to be scheduled, the resource allocation optimization problem becomes to find p*,w* for which $$\max_{p,w} \prod_{i \in U_D} \left(\alpha_i + \frac{(1-\alpha_i) w_i(t) \log_2\left(1 + \frac{p_i(t)}{n_i w_i(t)}\right)}{R_i}\right) \quad (9)$$

subject to $$\sum_{i \in U_D \cup U_R} p_i^* \le P \quad (10)$$

$$\sum_{i \in U_D \cup U_R} w_i^* \le W \quad (11)$$

$$w_i^*(t) \log_2\left(1 + \frac{p_i^*(t)}{n_i w_i^*(t)}\right) \ge r_i^o(t), i \in U_R \quad (12)$$

$$p_i^*(t), w_i^*(t) \ge 0, \forall i \in U_D \cup U_R. \quad (13)$$

Note that equation (9) implies $$\alpha_i R_i + (1-\alpha_i)\left(w_i(t)\log_2\left(1+\frac{p_i(t)}{n_i w_i(t)}\right) - r_i^o\right) > 0, \forall\, i \in U_D. \quad (14)$$

It is not guaranteed that a solution can be found to satisfy both equations 12 and 14. Since the objective function is an increasing function of (p(t), w(t)), the maximum is achieved when the power, bandwidth and rate constraints (10, 11, 12) are all met with equality. Any inequalities are replaced with equalities below.

A feasible set of (p(t),w(t)) can be the set of power and bandwidth distribution per user such that:

$$w_i(t)\log_2\left(1+\frac{\beta p_i(t)}{n_i w_i(t)}\right) \geq \left[-\frac{R_i \alpha_i}{1-\alpha_i}\right]^+ = \rho_i^0, \forall\, i \in U_D \quad (15)$$

$$w_i(t)\log_2\left(1+\frac{p_i(t)}{n_i w_i(t)}\right) \geq r_i^0, \forall\, i \in U_R \quad (16)$$

$$\sum_{i\in U_D \cup U_R} p_i^*(t) \leq P, \quad \sum_{i\in U_D \cup U_R} w_i^*(t) \leq W, \quad (17)$$

$$p_i^*(t), w_i^*(t) \geq 0, \forall\, i \in U_D \cup U_R$$

A feasible problem of distributing bandwidth and power resources is a problem for which the set (p(t),w(t)) is not empty.

Assuming that the problem is feasible, a Lagrangian function incorporating the power, bandwidth and/or rate constraints can be written $$L(w, p, \lambda_p, \lambda_w, \lambda^v) = \quad (18)$$

$$\prod_{i\in U_D}\left(\alpha_i + \frac{(1-\alpha_i)w_i(t)\log_2\left(1+\frac{p_i(t)}{n_i w_i(t)}\right)}{R_i}\right) + \lambda_p\left(P - \sum_{i\in U_D\cup U_R} p_i(t)\right) +$$

$$\lambda_w\left(W - \sum_{i\in U_D\cup U_R} w_i(t)\right) + \sum_{i\in U_R}\lambda_i^v\left(w_i(t)\log_2\left(1+\frac{p_i(t)}{n_i w_i(t)}\right) - r_i^0(t)\right).$$

The derivatives of the Lagrangian (18) with respect to $p_i, w_i$ for all users, $\lambda_p, \lambda_w$, and $\lambda^v_i$ for real time users, are zero when the Lagrangian is at its maximum.

For non-real time data user $i \in U_D$, $$\left.\frac{\partial L(p(t), w(t), \lambda_p, \lambda_w, \lambda^v)}{\partial p_i(t)}\right|_{(p^*,w^*)} = 0 = \Rightarrow$$

$$\frac{L^*}{\lambda_p} = \frac{n_i w_i^*(t) + \beta p_i^*(t)}{\beta \ln 2}\left(\frac{R_i \tilde{\alpha}_i}{w_i(t)} + \log_2\left(1+\frac{\beta p_i^*(t)}{n_i w_i^*(t)}\right)\right) \quad (19)$$

$$\left.\frac{\partial L(p(t), w(t), \lambda_p, \lambda_w, \lambda^v)}{\partial w_i(t)}\right|_{(p^*,w^*)} = 0 = \Rightarrow$$

-continued $$\frac{L^*}{\lambda_w} = \frac{(n_i w_i^*(t) + \beta p_i^*(t))\left(R_i \tilde{\alpha}_i + w_i^*(t)\log_2\left(1+\frac{\beta p_i^*(t)}{n_i w_i^*(t)}\right)\right)}{(n_i w_i^*(t) + \beta p_i^*(t))\log\left(1+\frac{\beta p_i^*(t)}{n_i w_i^*(t)}\right) - \frac{\beta}{\ln 2}x_i^*} \quad (20)$$

where $\tilde{\alpha} = \frac{\alpha_i}{1-\alpha_i}$. Let $\Lambda_p = \frac{L^*}{\lambda_p}$, and $\Lambda_w = \frac{L^*}{\lambda_w}$.

By dividing equation (19) with equation (20), for each $i \in U_D$ the following type of relation holds:

$$\frac{\Lambda_p}{\Lambda_w} = \Lambda_a = \frac{n_i}{\beta \ln 2}\left((1+x_i^*)\log(1+x_i^*) - \frac{\beta}{\ln 2}x_i^*\right), \quad (21)$$

where $x_i^* = \frac{\beta p_i^*(t)}{n_i w_i^*(t)}$ denotes the optimal effective SINR, which is the SINR multiplied by the SINR gap parameter $\beta$.

For real time users $i \in U_R$, applying similar processing yields the following relations:

$$\frac{\partial L(p(t), w(t), \lambda_p, \lambda_w, \lambda^v)}{\partial p_i(t)} = 0 \Rightarrow \frac{\lambda_p}{\lambda_i^v} = \frac{\beta}{n_i \ln 2}\frac{1}{1+\frac{\beta p_i^*(t)}{n_i w_i^*(t)}} \quad (22)$$

$$\frac{\partial L(p(t), w(t), \lambda_p, \lambda_w, \lambda^v)}{\partial w_i(t)} = \quad (23)$$

$$0 \Rightarrow \frac{\lambda_w}{\lambda_i^v} = \log_2\left(1+\frac{\beta p_i^*(t)}{n_i w_i^*(t)}\right) - \frac{\frac{\beta p_i^*(t)}{n_i w_i^*(t)}}{1+\frac{\beta p_i^*(t)}{n_i w_i^*(t)}}\frac{1}{\ln 2}$$

Using $\frac{\Lambda_p}{\Lambda_w} = \frac{\lambda_w}{\lambda_p}$ and dividing equations (23) to equation (22) for all $i \in U_R$ yields the relations:

$$\frac{\Lambda_p}{\Lambda_w} = \Lambda_a = \frac{n_i}{\beta \ln 2}\left((1+x_i^*)\log(1+x_i^*) - \frac{\beta}{\ln 2}x_i^*\right). \quad (24)$$

The relations (21) and (24) suggest using a function defined by $$f_a(x) = (1+x)\log(1+x) - \frac{\beta}{\ln 2}x. \quad (25)$$

The inverse of the function $\theta_a$ gives the effective signal to noise ratio:

$$x_i = f_a^{-1}(\beta \ln 2\Lambda_a/n_i), \forall i \in U_D \cup U_R \quad (26)$$

It can be proven that the signal to noise ratio ($x_i$) is a monotonic function of $\Lambda_a$ for all users $i \in U_R$. For users with real time data traffic, the following equations hold:

$$\left. \frac{\partial L(p(t), w(t), \lambda_p, \lambda_w, \lambda^v)}{\partial \lambda_i^w} \right|_{(p^*, w^*)} = 0 \Rightarrow$$

$$r_i^0 = w_i^*(t) \log_2\left(1 + \frac{p_i^*(t)}{n_i w_i^*(t)}\right), \forall i \in U_R. \quad (27)$$

For all the nodes 110a-n, the following derivatives are zero in the maximum of the objective (Lagrangian) function:

$$\left. \frac{\partial L(p, w, \lambda_p, \lambda_w, \lambda^v)}{\partial \lambda_p} \right|_{(p^*, w^*)} = 0 \Rightarrow P = \sum_{i \in U_D \cup U_R} p_i^*(t) \quad (28)$$

$$\left. \frac{\partial L(p, w, \lambda_p, \lambda_w, \lambda^v)}{\partial \lambda_w} \right|_{(p^*, w^*)} = 0 \Rightarrow W = \sum_{i \in U_D \cup U_R} w_i^*(t). \quad (29)$$

From equation (19) one can write the following relations:

$$\frac{\left[\Lambda_p - \frac{n_i}{\beta \ln 2}(1 + x_i^*) R_i \tilde{\alpha}_i\right]^+}{\log(1 + x_i^*)(1 + x_i^*)\frac{n_i}{\beta \ln 2}} = w_i^*(t), i \in U_D \quad (30)$$

$$\frac{\left[\Lambda_p - \frac{n_i}{\beta \ln 2}(1 + x_i^*) R_i \tilde{\alpha}_i\right]^+ x_i^*}{\log_2(1 + x_i^*)(1 + x_i^*)\frac{1}{\beta \ln 2}} = p_i^*(t), i \in U_D. \quad (31)$$

The operator $[.]+$ in equations (30) and (31) guarantees that $w_i, p_i \geq 0$ for all users. For known $\Lambda_p$ and $\Lambda_a$, the power and bandwidth for each user $i \in U_D$ can be calculated using equations (30) and (31). For a known $\Lambda_a$, the bandwidth and power for users $i \in U_R$ can be calculated using equation (27). However equations (27), (30), and (31) may not ensure that the bandwidth and power constraints are satisfied. Satisfying the bandwidth and power constraints can be further assured by the selection of $\Lambda_p$ and $\Lambda_a$. Let $S_p(\Lambda_a, \Lambda_p)$ and $S_w(\Lambda_a, \Lambda_p)$ to be the total bandwidth and total power corresponding to $\Lambda_p$ and $\Lambda_a$:

$$S_w(\Lambda_a, \Lambda_p) = \sum_{i \in U_D \cup U_R}^N w_i(\Lambda_a, \Lambda_p) = \quad (32)$$

$$\sum_{i \in U_D} \frac{\left[\Lambda_p - \frac{n_i}{\beta \ln 2}(1 + x_i) R_i \tilde{\alpha}_i\right]^+}{\log_2(1 + x_i)(1 + x_i)\frac{n_i}{\beta \ln 2}} + \sum_{i \in U_R} \frac{r_i^0}{\log_2(1 + x_i)}$$

$$S_p(\Lambda_a, \Lambda_p) = \sum_{i \in U_D \cup U_R}^N p_i(\Lambda_a, \Lambda_p) = \quad (33)$$

$$\sum_{i \in U_D} \frac{\left[\Lambda_p - \frac{n_i}{\beta \ln 2}(1 + x_i) R_i \tilde{\alpha}_i\right]^+ x_i}{\log_2(1 + x_i)(1 + x_i)\frac{1}{\ln 2}} + \sum_{i \in U_R} \frac{r_i^0 x_i n_i}{\log_2(1 + x_i)}$$

where $x_i = f_a^{-1}(\beta \ln 2\Lambda_a/n_i)$ is the SINR of user i. The problem becomes finding $\Lambda_p^*$ and $\Lambda_a^*$ such that $$S_w(\Lambda_a^*, \Lambda_p^*) = W \quad (34)$$

$$S_p(\Lambda_a^*, \Lambda_p^*) = P \quad (35)$$

using equations (21), (24), (34) and (35). Note that although $\Lambda_p$ and $\Lambda_a$ are independent variable that determine power and bandwidth of each node, they become dependent when the power and bandwidth constraints (34), (35) need to be satisfied.

Figure 3:
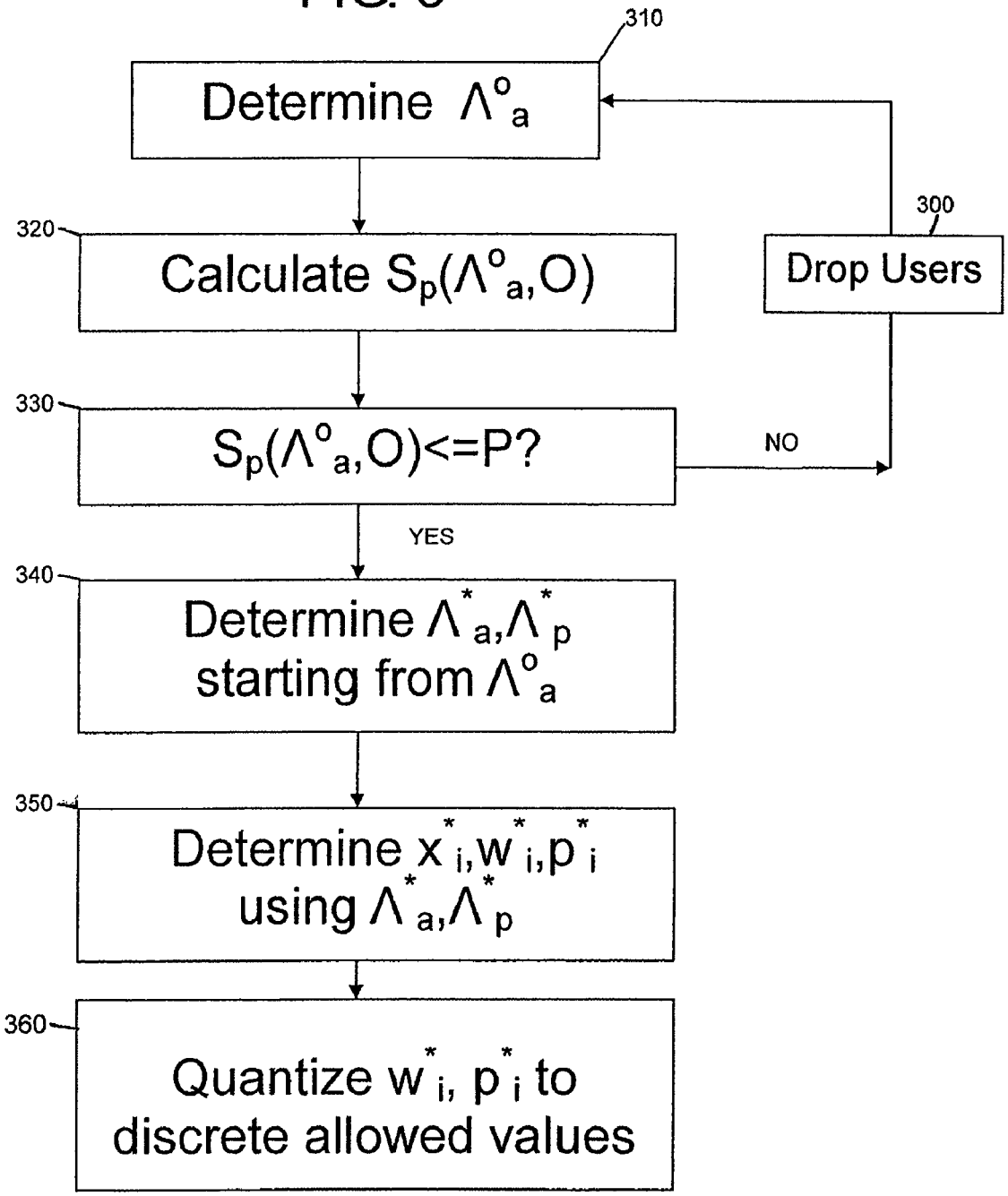
FIG. 3 is a flow chart of an OFDMA scheduler, according to one embodiment.

Based on the above defined formalism, FIG. 3 is a flow diagram of the operations performed in a scheduler 252 according to an embodiment. The method determines the optimal bandwidth and power allocation to N users including non-real time data users and/or real time (like voice and video) users, by determining parameters $\Lambda_p^*$ and $\Lambda_a^*$ which are defined above using a Lagrangian function which incorporates the total power, total bandwidth and rate constraints for real time (such as, voice and video) users. First at 310, it is determined the smallest value $\Lambda_a^0 > 0$ for which $S_w(\Lambda_a^0, 0) \leq W$. A solution is feasible (i.e. the conditions 15, 16, and 17 are satisfied) if and only if $S_p(\Lambda_a^0, 0) \leq P$. Before performing additional operations to assign the resources (power and bandwidth) among the users, the scheduler 252 calculates $S_p(\Lambda_a^0, 0)$ at 320. At 330, $S_p(\Lambda_a^0, 0)$ calculated at 320 is compared to P. If $S_p(\Lambda_a^0, 0) > P$, there are too many users. The scheduler 252 will drop some users at 300 and seeks again for $\Lambda_a^0 > 0$ until $S_p(\Lambda_a^0, 0) \leq P$.

Once it is known that there is a feasible solution, the scheduler 252 searches for a pair of parameters $\Lambda_p^*$ and $\Lambda_a^*$ using $\Lambda_a^0$ as a start point at 340. The parameters $\Lambda_p^*$ and $\Lambda_a^*$ are then used to effectively calculate for each user the optimal SNR values $x_i^*$, the optimal bandwidth values $w_i^*$ and the optimal power values $p_i^*$ for the users at 350. For a system which assigns bandwidth in discrete values (for 802.16e, a subchannel is the smallest unit for bandwidth assignment) and transmission power (for 802.16e, the transmission power can be boosted in steps of −12, −9, −6, −3, 0, 3, 6, 9 db) and/or coding and modulation scheme (a set of modulation scheme and coding rates, with respective required minimal receiver SINR) in discrete levels (a set of predefined coding and modulation schemes and predefined power boost levels). At 360, the bandwidth $w^*(t)$ and power $p^*(t)$ vector can be quantized with proper schemes. As an example, the bandwidth and power can be quantized to the closest allowed discrete values.

According to an aspect of an embodiment, at 310, the scheduler 252 determines the smallest value $\Lambda_a^0 > 0$ for which the total bandwidth is allocated to users when $\Lambda_p = 0$, i.e. the relationship $S_w(\Lambda_a^0, 0) \leq W$ is satisfied. In order to find the smallest value $\Lambda_a^0 > 0$, the scheduler performs a binary search, narrowing a search interval for $\Lambda_a^0$ in the following manner. Initially, for a chosen parameter $\Delta_a > 0$ it is determined the smallest integer $k > 0$ so that $S_w(2^k \Delta_a, 0) < W$. Then a start search interval is defined as $\Lambda_a^l = 2^{k-1} \Delta_a$, $\Lambda_a^h = 2^k \Delta_a$. Because k is the smallest integer so that $S_w(2^k \Delta_a, 0) < W$, $S_w(2^{k-1} \Delta_a, 0) \geq W$, the sign of $S_w(\Lambda, 0) - W$ changes in the start search interval $(\Lambda_a^l, \Lambda_a^h)$. Once the initial search interval $(\Lambda_a^l, \Lambda_a^h)$ is established, the binary search of $\Lambda_a^0$ iteratively narrows this search interval so that the sign of $S_w(\Lambda, 0) - W$ changes the sign inside the interval until a convergence criteria is satisfied. The function $S_w(\Lambda_a^m, 0)$ is calculated for $\Lambda_a^m = (\Lambda_a^l + \Lambda_a^h)/2$. If the convergence criteria $$\left|\frac{\Lambda_a^h}{\Lambda_a^l} - 1\right| < \varepsilon$$

is satisfied, then $\Lambda_a^0 = \Lambda_a^m$. Otherwise if $S_w(\Lambda_a^m, 0) < W$, $\Lambda_a^h = \Lambda_a^m$, else $\Lambda_a^l = \Lambda_a^m$.

According to an aspect of an embodiments, at step 340, the scheduler 252 searches for a pair of parameters $\Lambda_p^*$ and $\Lambda_a^*$ for which $S_w(\Lambda_a^*, \Lambda_p^*) = W$ and $S_p(\Lambda_a^*, \Lambda_p^*) = P$ using $\Lambda_a^0$ as a start point. The binary search for the parameters $\Lambda_p^*$ and $\Lambda_a^*$ employs another binary search of $\Lambda_p^*$ for a given $\Lambda_a$ such that $S_w(\Lambda_a, \Lambda_p^*) = W$.

The binary search of $\Lambda_p^*(\Lambda)$ such that $S_p(\Lambda, \Lambda_p^*) = P$ for a given $\Lambda$ (which is similar to the above-described binary search of $\Lambda_a^0$) narrows a search interval for $\Lambda_p^*$ in the following manner. Initially, for a chosen parameter $\Delta_p > 0$ it is determined the smallest integer $k > 0$ so that $S_w(\Lambda, 2^k \Delta_p) > W$. Then, a start search interval is defined as $\Lambda_p^l = 2^{k-1} \Delta_p$, $\Lambda_p^h = 2^k \Delta_p$. Because k is the smallest integer so that $S_w(\Lambda, 2^k \Delta_p) < W$, $S_w(\Lambda, 2^{k-1} \Delta_p) \geq W$, the sign of $S_w(\Lambda, \Lambda) - W$ changes in the interval $(\Lambda_p^l, \Lambda_p^h)$. Once the initial search interval $(\Lambda_p^l, \Lambda_p^h)$ is established, the binary search of $\Lambda_p^*$ iteratively narrows this search interval until a convergence criteria is satisfied. The function $S_w(\Lambda, \Lambda_p^m)$ is calculated for $\Lambda_p^m = (\Lambda_p^l + \Lambda_p^h)/2$. If the convergence criteria $$\left|\frac{\Lambda_p^h}{\Lambda_p^l} - 1\right| < \varepsilon$$

is satisfied, then $\Lambda_p^* = \Lambda_p^m$. Otherwise if $S_w(\Lambda, \Lambda_p^m) > W$, $\Lambda_p^h = \Lambda_p^m$, else $\Lambda_p^l = \Lambda_p^m$.

The binary search for the parameters $\Lambda_p^*$ and $\Lambda_a^*$ for which $S_w(\Lambda_a^*, \Lambda_p^*) = W$ and $S_p(\Lambda_a^*, \Lambda_p^*) = P$ starting from $\Lambda_a^0$ is described hereinafter. Initially for a chosen parameter $\Delta_a > 0$ it is determined the smallest integer k so that $S_p(2^k \Delta_a, \Lambda_p^*(2^k \Delta_a)) > P$. Then, a start search interval is defined as $\Lambda_a^h = 2^k \Delta_a$, and $\Lambda_a^l = 2^{k-1} \Delta_a$ is $k > 0$ or $\Lambda_a^l = \Lambda_a^0$ if $k = 0$. Once the initial search interval $(\Lambda_a^l, \Lambda_a^h)$ is established, the binary search iteratively narrows this search interval until a convergence criteria is satisfied. The function $S_p(\Lambda_a^m, \Lambda_p^*(\Lambda_a^m))$ is calculated for $\Lambda_a^m = (\Lambda_a^l + \Lambda_a^h)/2$. If the convergence criteria $$\left|\frac{\Lambda_a^h}{\Lambda_a^l} - 1\right| < \varepsilon$$

is satisfied, then $\Lambda_a^* = \Lambda_a^m$ and $\Lambda_p^* = \Lambda_p^*(\Lambda_a^m)$. If $S_p(\Lambda_a^m, \Lambda_p^*(\Lambda_a^m)) > P$, $\Lambda_a^h = \Lambda_a^m$, else $\Lambda_a^l = \Lambda_a^m$.

After determining $\Lambda_p^*$ and $\Lambda_a^*$, the optimal SNR values $x^*_i$, the optimal bandwidth values $w^*_i$ and the optimal power values $p^*_i$ for each of the users are determined at 350. The optimal SNR values $x^*_i$ are calculated using the following formula:

$$x_i^* = f_a^{-1}(\beta \ln 2 \Lambda_a^*/n_i) \tag{36}$$

The optimal bandwidth values $w^*_i$ are calculated for users $i \in U_D$ $$w_i^*(t) = \frac{\left[\Lambda_p - \frac{n_i}{\beta \ln 2}(1 + x_i^*)R_i \tilde{\alpha}_i\right]^+}{\log_2(1 + x_i^*)(1 + x_i^*)\frac{n_i}{\beta \ln 2}} \tag{37}$$

and for users $i \in U_R$ $$w_i^*(t) = \frac{r_i^0(t)}{\log_2(1 + x_i^*)}. \tag{38}$$

The optimal power values for users $i \in U_V \cup U_D$ are given by:

$$p_i^*(t) = \frac{n_i w_i^* x_i^*(t)}{\beta}. \tag{39}$$

The optimal power and bandwidth values determined as described above take any value in a continuum of values. However, usually only a limited set of discrete values are allowed. Therefore, the optimal bandwidth values $w^*_i$ and the optimal power values $p^*_i$ for the users determined at 350, are quantized at 360.

Figure 4:
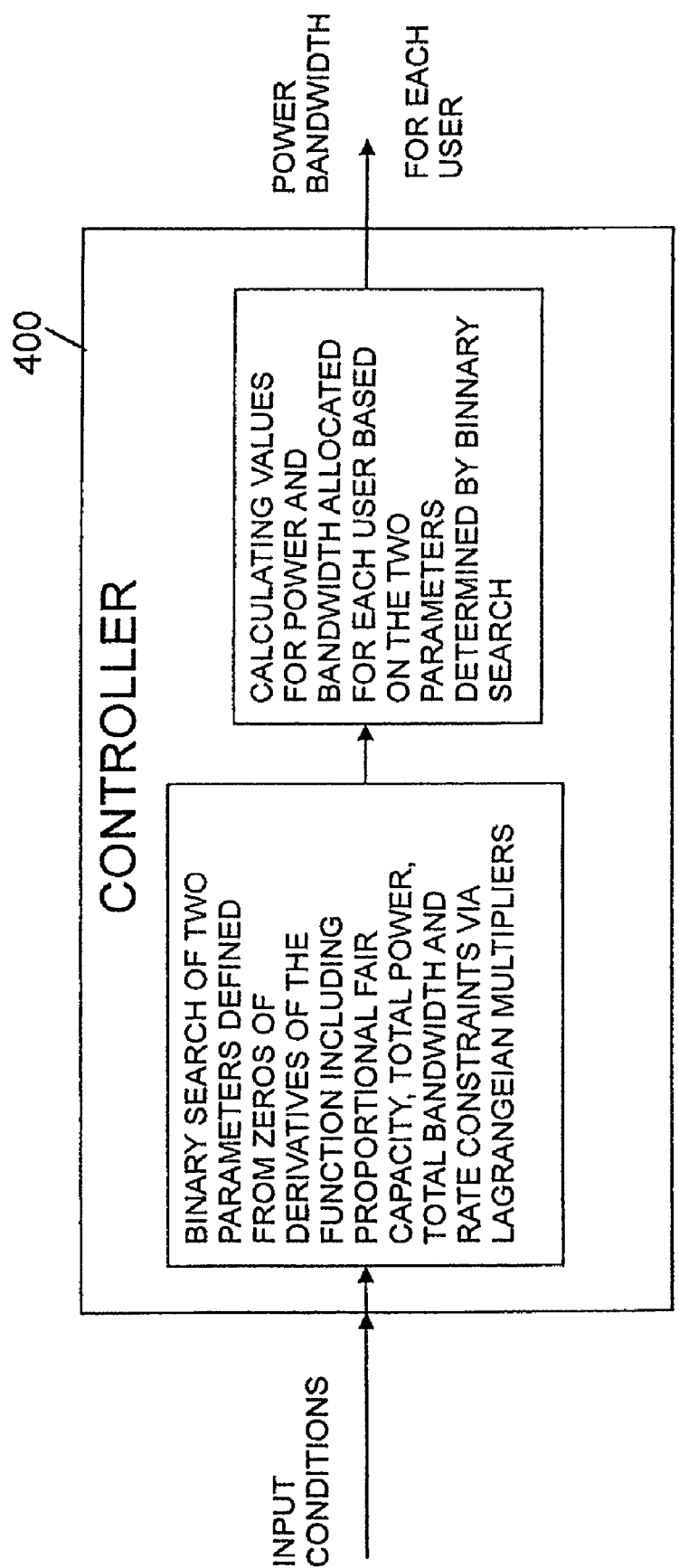
FIG. 4 is a diagram of a multicarrier wireless communication apparatus, according to an embodiment.

FIG. 4 is a diagram of a multicarrier wireless communication apparatus having a controller 400. The input conditions are the total power, the total bandwidth available, the Qos requirements of each user, the rates of the users in the previous time slots or any combinations thereof. The controller 400 performs a binary search of two parameters $\Lambda_p^*$ and $\Lambda_a^*$ which maximize L, the Lagrangian function which is defined to ensure long term proportional fairness, total power, total bandwidth, and rate constraints for real time users, using Lagrangian multipliers, while distributing the total power and the total bandwidth to the users. The controller 400 then calculates a set of optimal bandwidth values and optimal power values for the user based on the two parameters as described above. The controller may also quantize the optimal bandwidth and power values to allowed discrete values.

Available bandwidth and power for users demanding real time and non-real time data traffic are scheduled, while maximizing proportional fairness for the users over a plurality of time slots, and meeting quality of service (e.g., a required rate, which is the amount of data communicated in the time slot, and is determined by the power and bandwidth allocated to the user) constraints for real time data traffic users. The Lagrangian multipliers are used to define a function according to an embodiment which includes the proportional fair capacity over the plurality of time slots, and the total power, the total bandwidth, and rate of the real time users' constraints. A maximum of the function is determined for each time slot by binary searching two parameters while observing the total power and total bandwidth. An optimal allocation of the bandwidth and power is calculated for the time slot using the two parameters. A calculated set of power and bandwidth values for the users may be quantized to allowed discrete values.

A multicarrier wireless communication apparatus supporting real time and/or non-real time data traffic for users has a controller which for each time slot binary searches two parameters maximizing a function including proportional fairness over a plurality of time slots, and a total power, a total bandwidth or rate constraints for real time data traffic users, or any combination thereof, using Lagrangian multipliers, while distributing the total power and the total bandwidth to all the users. The controller then calculates optimal signal to noise ratio values, optimal bandwidth values and optimal power values corresponding to each user based on the two parameters.

One benefit of the various embodiments of the scheduler 252 is that the bandwidth and/or power allocation optimizes capacity under proportional fairness rules for heterogeneous data traffic. The scheduler 252 is computationally efficient and meets the real-time constraints in actual systems.

Another benefit is that such a scheduler can be used as part of the radio resource management in OFDMA-based base stations, such as planned for WiMAX (IEEE 802.16e). The scheduler has a significant impact on overall system performance.

The above embodiments may be implemented in software and/or computing hardware. For, example, the scheduler 252 can be implemented in the MAC layer of the base station 105. However, in other embodiments, the scheduler 252 can be implemented in two or more layers, for example, in the MAC layer and/or the physical layer. The station 105 is any computing device, such as a computer including a controller 400.

The present invention can also be embodied as computer-readable codes on a computer-readable medium executable by a computer. A computer-readable medium is any medium that can store data, which can be thereafter read by a computer system. Examples of the computer-readable medium include (without limitation) read-only memory (ROM), random-access memory (RAM), CD-ROMs, magnetic tapes, floppy disks, optical data storage devices. Transmission communication media includes carrier waves (such as wireless and/or wired data transmission, for example, through the Internet).

The many features and advantages of the invention are apparent from the detailed specification and, thus, it is intended by claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A multicarrier wireless communication apparatus supporting real time and/or non-real time data traffic for users, comprising:
   a controller that performs
      for each time slot binary searching two parameters maximizing a function that includes
         a proportional fairness over a plurality of time slots, the proportional fairness being a sum of logarithms of user rates, and
         a total power, a total bandwidth and rate constraints for real time data traffic users, using Lagrangian multipliers,
      while distributing the total power and the total bandwidth to all the users, and
      calculating optimal signal to noise ratio values, optimal bandwidth values and optimal power values corresponding to each user based on the two parameters.

2. The apparatus of claim 1, wherein the controller estimates whether the optimal signal to noise ratio values, optimal bandwidth values and optimal values for the users exist, before performing binary searching.

3. The apparatus of claim 2, wherein the controller drops some users if the optimal signal to noise ratio values, optimal bandwidth values and optimal values for the users does not exist.

4. The apparatus of claim 1, wherein the binary search finds first one of the two parameters while the other one of the two parameters is zero, the total bandwidth being distributed, then iteratively performs binary searches of the two parameters, the total bandwidth and the total power being distributed.

5. The apparatus of claim 1, wherein the controller determines discrete bandwidth values and discrete power values based on quantizing the optimal bandwidth values and the optimal power values to allowed values.

6. The apparatus of claim 5, wherein the controller determines the discrete bandwidth values and discrete power values using the highest modulation and coding scheme allowed.

7. The apparatus of claim 1, wherein the rate constraints ensure a minimal transmission rate and a limited delay for non-real time data.

8. A method of allocating a total bandwidth and a total power to users performing non-real time data and/or real time traffic, in each time slot, in a wireless multicarrier apparatus, comprising:
   using a computer binary searching two parameters that maximize a function that includes
      a proportional fair capacity over a plurality of time slots, the proportional fair capacity is a sum of logarithms of user rates, and
      limitations on the total power, the total bandwidth, and rate of users performing real-time traffic, using Lagrangian multipliers; and
   calculating a power value and a bandwidth value for each user using the determined two parameters.

9. The method of claim 8, further comprising:
   estimating whether allocating the total bandwidth and the total power to users has a feasible solution before determining the two parameters.

10. The method of claim 8, wherein the binary search includes
    binary searching one of the two parameters while the other one of the two parameters is zero, with the total bandwidth being distributed, and
    iteratively performing binary searches of the two parameters, with the total bandwidth and the total power being distributed.

11. The method of claim 8, where the optimal bandwidth and power values are quantized to match allowed bandwidth and power values.

12. A computer readable medium storing executable codes which make a computer to execute operations of allocating a total bandwidth and a total power to users communicating non-real time data and/or real traffic, in each time slots, by:
   binary search two parameters, while observing limitations on the total power and the total bandwidth, wherein the two parameters maximize a function that includes
      a proportional fair capacity over a plurality of time slots, the proportional fair capacity is a sum of logarithms of user rates, and
      the limitations on the total power, the total bandwidth, and rates of users performing real-time traffic, by using Lagrangian multipliers; and
   calculating power values and bandwidth values for the users using the determined two parameters.

13. The computer readable medium of claim 12, the method further comprising:

estimating whether allocating the total bandwidth and the total power to users has a feasible solution, before determining the two parameters.

14. The computer readable medium of claim 12, wherein the binary search includes finding one of the two parameters while the other one of the two parameters is zero, with the total bandwidth being distributed, and iteratively performing binary searches of the two parameters, with the total bandwidth and the total power being distributed.

15. The computer readable medium of claim 12, where the optimal bandwidth and power values are quantized to match allowed bandwidth and power values.

* * * * *

UNITED STATES PATENT AND TRADEMARK OFFICE
CERTIFICATE OF CORRECTION

| | | |
|---|---|---|
| PATENT NO. | : 7,768,973 B2 | Page 1 of 1 |
| APPLICATION NO. | : 11/785892 | |
| DATED | : August 3, 2010 | |
| INVENTOR(S) | : Chenxi Zhu et al. | |

It is certified that error appears in the above-identified patent and that said Letters Patent is hereby corrected as shown below:

Title Page, Item (56) (Other Publications), Line 1, delete "Datqa" and insert --Data--, therefor.

Title Page, Item (56) (Other Publications), Line 1, delete "multuser" and insert --multiuser--, therefor.

Signed and Sealed this
Twentieth Day of March, 2012

David J. Kappos
*Director of the United States Patent and Trademark Office*